(12) United States Patent
Namekata

(10) Patent No.: US 12,198,644 B2
(45) Date of Patent: Jan. 14, 2025

(54) DISPLAY DEVICE AND CONTROL METHOD

(71) Applicant: Panasonic Intellectual Property Management Co., Ltd., Osaka (JP)

(72) Inventor: Yuuki Namekata, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/229,320

(22) Filed: Aug. 2, 2023

(65) Prior Publication Data

US 2024/0046890 A1   Feb. 8, 2024

(30) Foreign Application Priority Data

Aug. 3, 2022   (JP) ................. 2022-123748

(51) Int. Cl.
*G09G 3/34* (2006.01)
*G02F 1/13357* (2006.01)
*G09G 3/36* (2006.01)
*G09G 5/10* (2006.01)

(52) U.S. Cl.
CPC ..... *G09G 3/3426* (2013.01); *G02F 1/133603* (2013.01); *G09G 3/36* (2013.01); *G09G 5/10* (2013.01); *G09G 2320/0626* (2013.01); *G09G 2320/0646* (2013.01); *G09G 2360/14* (2013.01); *G09G 2360/144* (2013.01); *G09G 2360/16* (2013.01); *G09G 2380/10* (2013.01)

(58) Field of Classification Search
CPC ......... G09G 3/3426; G09G 2320/0646; G09G 2360/14; G09G 5/10; G09G 2360/144; G09G 2360/16; G09G 3/36; G09G 2320/0626; G09G 2380/10; G02F 1/133603; B60Q 3/54; B60R 2013/0287; G02B 6/006; B60K 2360/1523; B60K 2360/339

See application file for complete search history.

(56) References Cited

U.S. PATENT DOCUMENTS

2007/0222740 A1* 9/2007 Hanada ................ G09G 3/3406
                                                            345/102
2017/0162176 A1* 6/2017 Benchikhi ................ B60Q 3/54

FOREIGN PATENT DOCUMENTS

JP   2006-267780   10/2006
JP   2006-285064   10/2006
JP   2013-088629   5/2013

* cited by examiner

*Primary Examiner* — Douglas M Wilson

(74) *Attorney, Agent, or Firm* — Greenblum & Bernstein, P.L.C.

(57) ABSTRACT

In a display device, a display includes a display area for displaying a display image, and a peripheral area surrounding the display area. A control circuit receives, from an illuminance sensor for detecting an illuminance of an incident light, the illuminance and controls the display. The display area includes a first end area that is an area located near the peripheral area. The control circuit derives a brightness ratio that is a ratio between a brightness of the first end area and a brightness of the peripheral area, based on the illuminance and image data for the display image. The control circuit controls, when the brightness ratio is larger than a brightness ratio threshold value that is a predefined value, the display to cause the brightness ratio to be equal to or smaller than the brightness ratio threshold value.

15 Claims, 9 Drawing Sheets

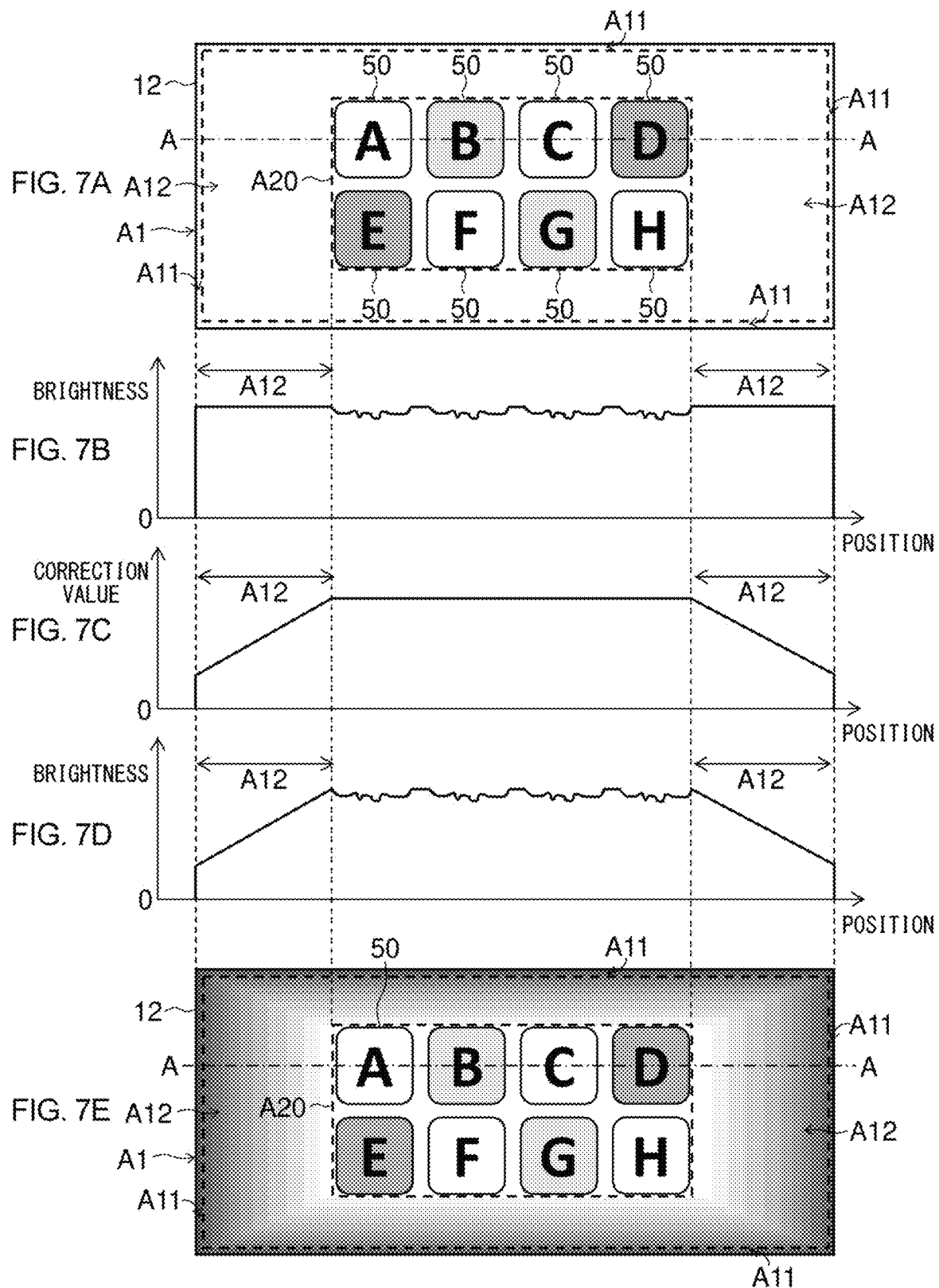

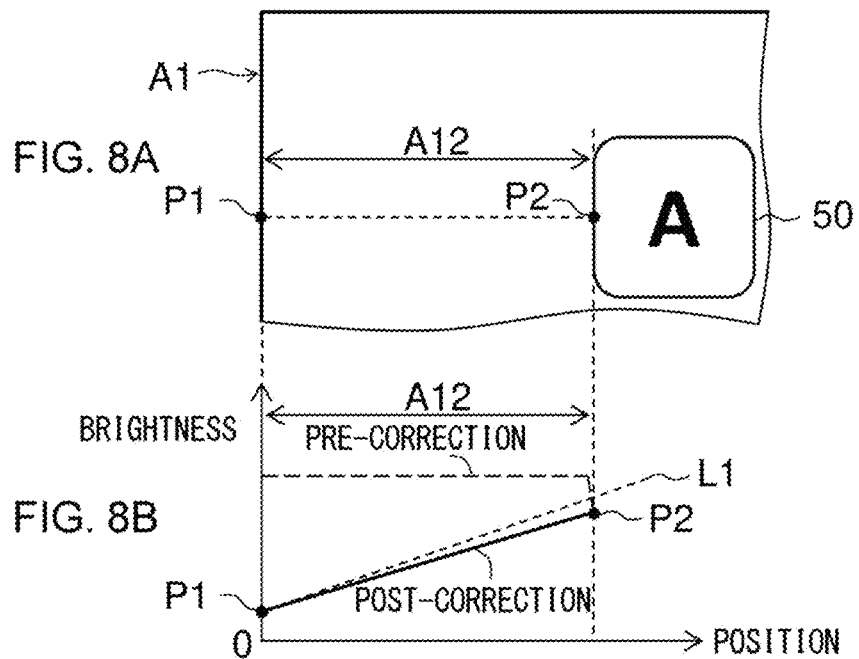
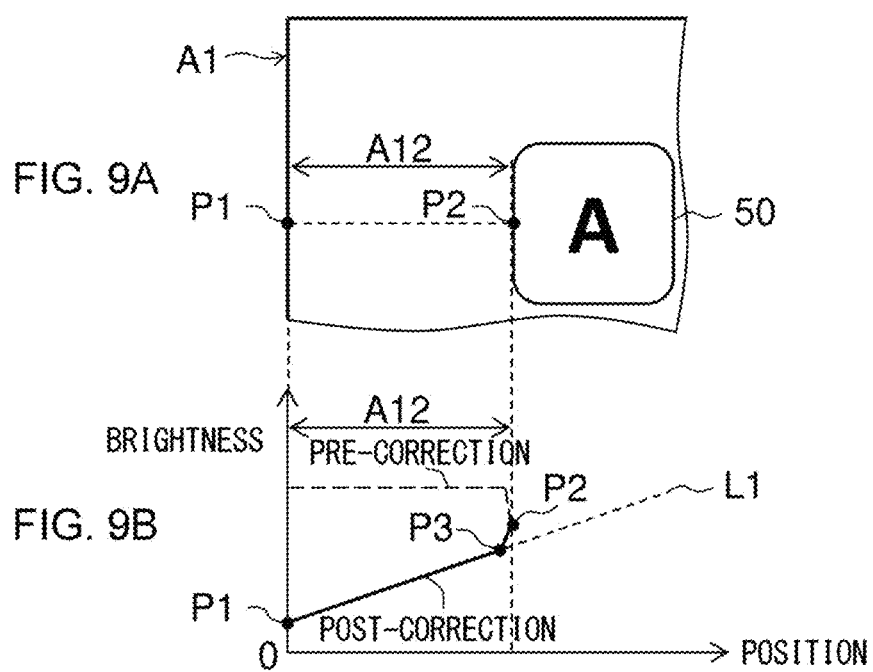

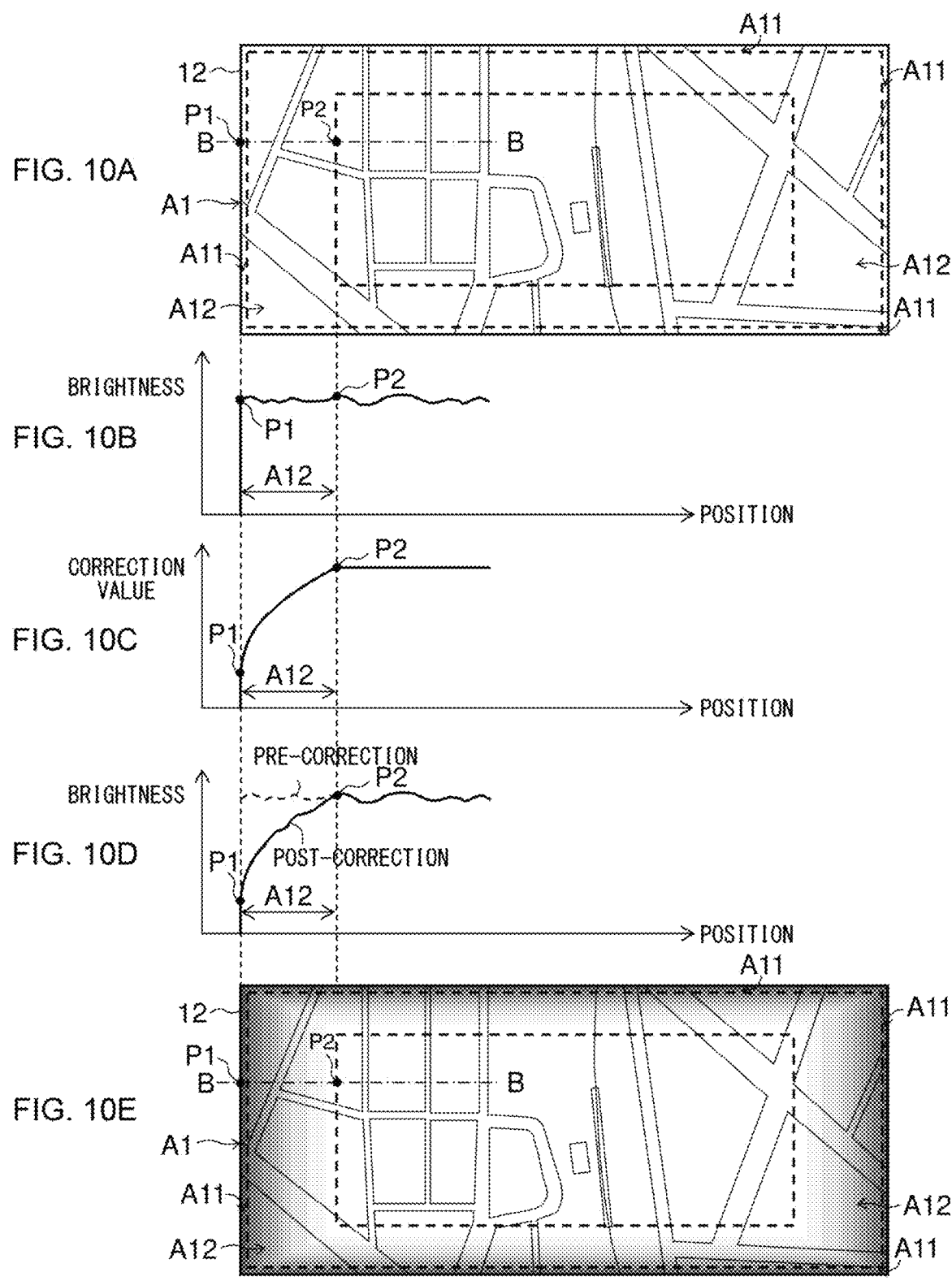

DISPLAY DEVICE AND CONTROL METHOD

BACKGROUND

1. Field

The present disclosure relates to a display device and a control method.

2. Description of the Related Art

Image display devices that perform video signal processing control and display brightness control adaptively are known (see, for example, patent literature 1). The image display device detects a variation in ambient illuminance and detects a video characteristic such as an average value of brightness of an input video. When the variation in illuminance is large and fast, the image display device calculates an adaptation target property by subjecting the variation in detected illuminance to predefined LPF operation. The image display device defines the adaptation target property as a target value and performs video signal processing control and display brightness control adaptively by allowing for the video characteristic of the input video.
[Patent literature 1] JP2006-285064

SUMMARY

A further improvement is called for in display devices.

A display device according to an aspect of the present disclosure includes: a display that includes a display area for displaying a display image, and a peripheral area surrounding the display area; and a control circuit that receives, from an illuminance sensor for detecting an illuminance of an incident light, the illuminance and controls the display, wherein the display area includes a first end area that is an area located near the peripheral area. The control circuit derives a brightness ratio that is a ratio between a brightness of the first end area and a brightness of the peripheral area, based on the illuminance and image data for the display image, and controls, when the brightness ratio is larger than a brightness ratio threshold value that is a predefined value, the display to cause the brightness ratio to be equal to or smaller than the brightness ratio threshold value.

Another aspect of the present disclosure relates to a control method. The method is a control method adapted to a display device including a display that includes a display area for displaying a display image, and a peripheral area surrounding the display area, the display area including a first end area that is an area located near the peripheral area, the method including: receiving, from an illuminance sensor for detecting an illuminance of an incident light, the illuminance; deriving a brightness ratio that is a ratio between a brightness of the first end area and a brightness of the peripheral area, based on the illuminance; and controlling, when the brightness ratio is larger than a brightness ratio threshold value that is a predefined value, the display to cause the brightness ratio to be equal to or smaller than the brightness ratio threshold value.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A-7E are diagrams for describing the image brightness decreasing process for a centralized image;

FIGS. 8A and 8B are diagrams for describing correction values for correcting the display image of FIGS. 7A-7E;

FIGS. 9A and 9B are diagrams for describing correction values for correcting another display image;

FIGS. 10A-10E are diagrams for describing the image brightness decreasing process for a non-centralized image;

DETAILED DESCRIPTION

Figure 1:
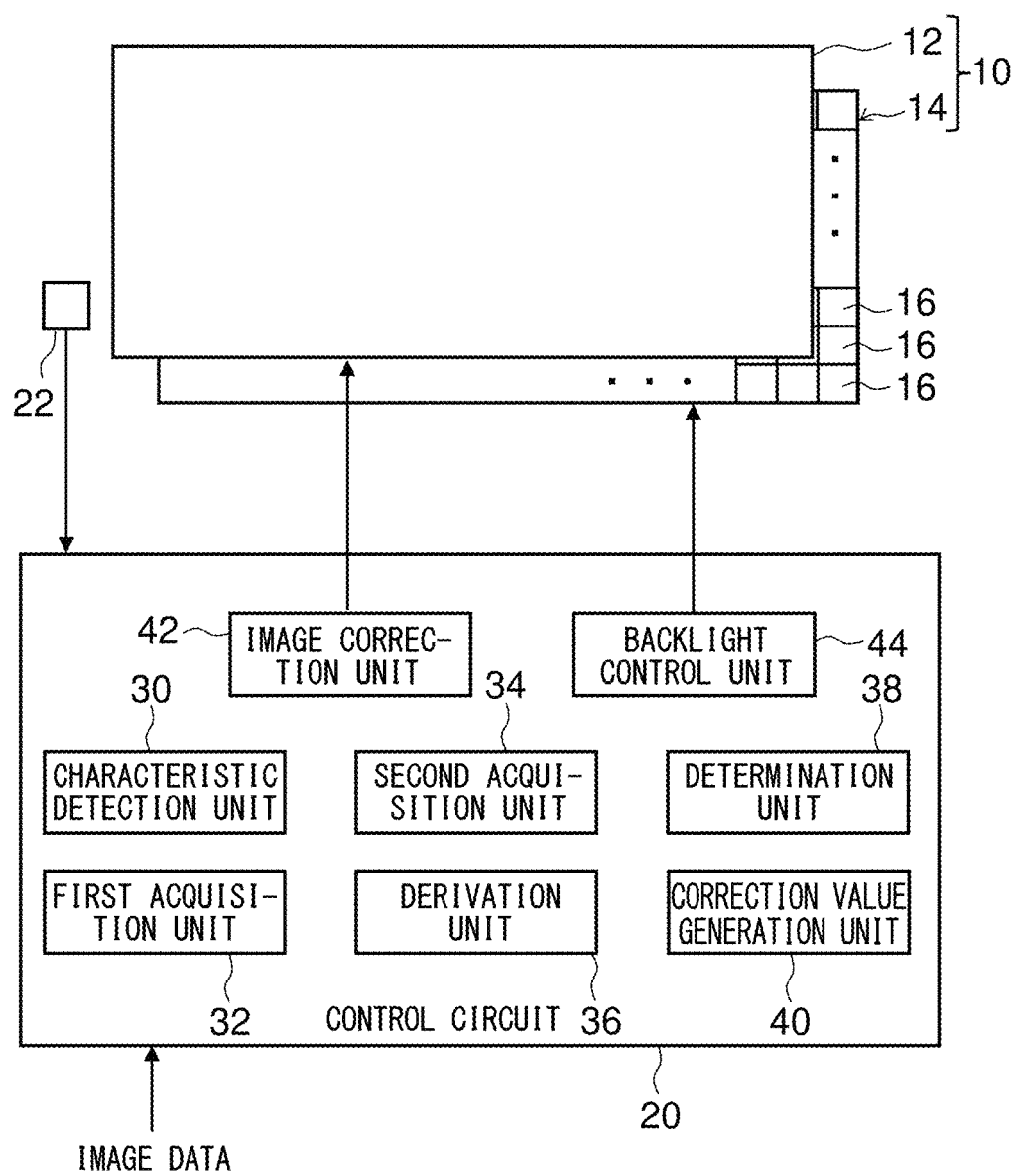
FIG. 1 shows a configuration of a display device of the embodiment.

The invention will now be described by reference to the preferred embodiments. This does not intend to limit the scope of the present invention, but to exemplify the invention.

(Base Findings of Present Disclosure)

Before a specific description of embodiments is given, the base findings will be described. The present inventor has discovered an issue in that, in display devices in which a decorated layer is provided on the side of a display panel toward the observer and in which the pattern of the decorated layer is visible in a display area for displaying an image and a peripheral area surrounding the display area, the boundary between the display area and the peripheral area may be viewed easily depending on the illuminance of a light incident on the display device.

According to the study of the present inventor, the brightness ratio, defined as a ratio of the brightness of the display area with respect to the brightness of the peripheral area near the boundary between the display area and the peripheral area, may become relatively large when the illuminance of an incident light is relatively low. When the brightness ratio near the boundary is large, the boundary between the display area and the peripheral area will be viewed easily. When the brightness ratio near the boundary is larger than a threshold value, therefore, it is useful to control the brightness ratio at the threshold value or smaller.

Hereinafter, identical or like constituting elements, members, steps shown in the drawings are represented by identical symbols, and a duplicate description will be omitted as appropriate. The dimension of members in the drawings is enlarged or reduced as appropriate to facilitate understanding.

FIG. 1 shows a configuration of a display device 1 of the embodiment. A display device 1 is described, by way of one example, as being a vehicle-mounted display device, but the usage of the display device 1 is not particularly limited. The display device 1 may be a display device of a mobile electronic appliance or a display device of a stationary electronic appliance.

The display device 1 is, for example, installed near the center of the center console in the vehicle cabin. The display device 1 displays various information. The display device 1 includes a display 10, a control circuit 20, and an illuminance sensor 22.

Any of various devices for displaying images can be used as the display 10. The display 10 displays an image by outputting an image light from the display surface. In the embodiment, the display 10 is described by way of one example as being a liquid crystal display, but the display 10 may be a self-luminous type display such as an organic EL display.

The display 10 includes a display panel 12 and a backlight 14. The display 10 also includes a surface layer described layer, but an illustration thereof is omitted in FIG. 1. The display 10 may include a publicly known member such as an optical sheet and a protective layer (not shown).

The display panel 12 is a liquid crystal panel. The backlight 14 is a direct-lit backlight. The backlight 14 is located on the rear surface of the display panel 12 and radiates light to the display panel 12. The backlight 14 includes a plurality of light sources 16 that illuminate the display panel 12. A light-emitting diode (LED) (not shown) is provided in each of the plurality of light sources 16. The plurality of light sources 16 are, for example, arranged in a matrix. Each of the light sources 16 forms a light-emitting area. The plurality of light sources 16 need not necessarily be arranged regularly but may be arranged irregularly in accordance with the shape of the display panel 12 or the displayed content. The brightness of the respective light sources 16 can be controlled individually.

The control circuit 20 causes the display panel 12 to display a display image via a liquid crystal drive circuit (not shown) based on image data supplied from outside. The control circuit 20 controls the backlight 14 via a light source drive circuit (not shown) and controls the brightness of each light source 16.

The illuminance sensor 22 detects the illuminance of light incident on the display 10 and outputs a signal indicating the detected illuminance to the control circuit 20. As viewed from an observer, the illuminance sensor 22 is located adjacent to the display panel 12. This makes it possible to detect illuminance approximate to the illuminance of external light incident on the display panel 12. The control circuit 20 controls the display 10 based on the illuminance detected by the illuminance sensor 22.

The control circuit 20 includes a characteristic detection unit 30, a first acquisition unit 32, a second acquisition unit 34, a derivation unit 36, a determination unit 38, a correction value generation unit 40, an image correction unit 42, and a backlight control unit 44. The detail of the process in the control circuit 20 will be described later. The configurations of the control circuit 20 can be implemented by cooperation between hardware resources and software resources or only by hardware resources. As the hardware resources, microcomputers, CPUs, DSPs, ROMs, RAMs, ASICs, FPGAs, or other LSIs can be employed. As the software resources, programs such as firmware can be employed. In the embodiment, the control circuit 20 operates to implement the functions of the characteristic detection unit 30, the first acquisition unit 32, the second acquisition unit 34, the derivation unit 36, the determination unit 38, the correction value generation unit 40, the image correction unit 42, and the backlight control unit 44. The control circuit 20 according to the embodiment includes, for example, a CPU, a ROM, and a RAM. The ROM stores various programs. The RAM is a work area used when a program is executed by the CPU. The CPU runs a program stored in the ROM by using the RAM as a work area to implement the functions of the characteristic detection unit 30, the first acquisition unit 32, the second acquisition unit 34, the derivation unit 36, the determination unit 38, the correction value generation unit 40, the image correction unit 42, and the backlight control unit 44. The respective functional units may be implemented by different hardware pieces.

Figure 2:
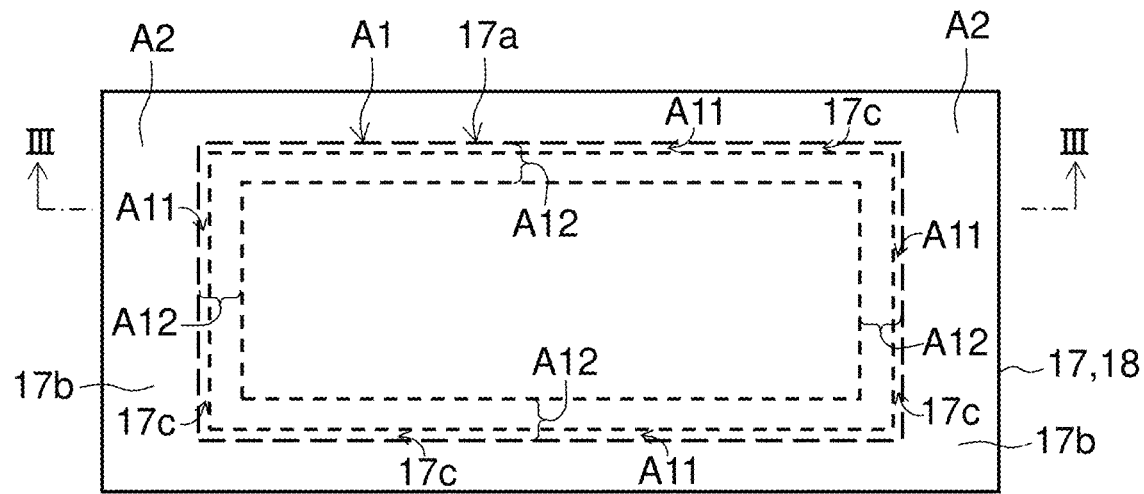
FIG. 2 is a plan view of the display of FIG. 1.
Figure 3:
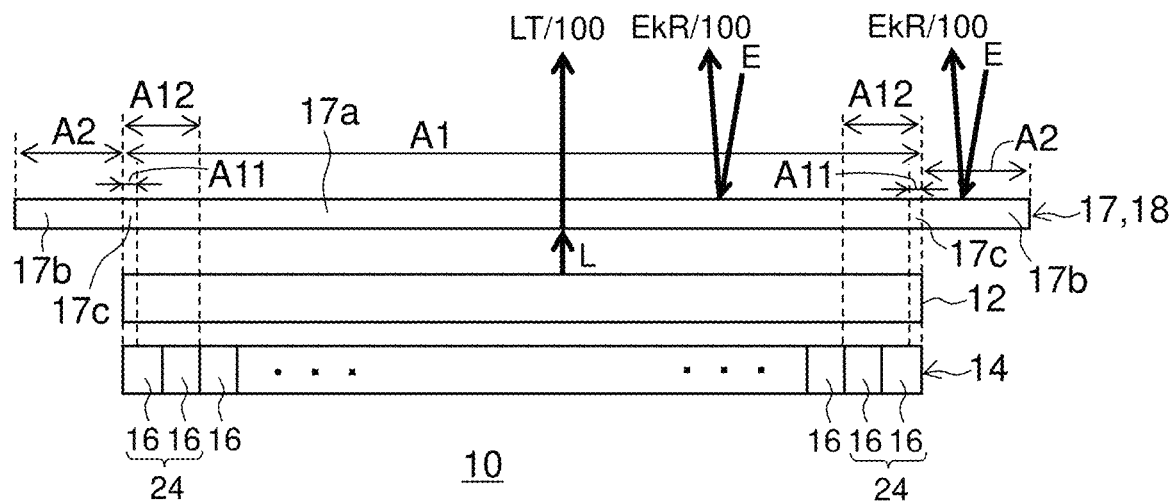
FIG. 3 is a longitudinal sectional view of the display of FIG. 2 along III-III.

FIG. 2 is a plan view of the display 10 of FIG. 1. FIG. 2 is a front view of the display 10, i.e., a view from the observer. FIG. 3 is a longitudinal sectional view of the display 10 of FIG. 2 along III-III.

The display 10 includes a display area A1 for displaying a display image and a peripheral area A2 surrounding the display area A1. The display area A1 is, for example, rectangular. The display area A1 is an area corresponding to the display surface of the display panel 12. The display panel 12 displays a display image in the display area A1. The image is not displayed in the peripheral area A2.

The display area A1 includes a first end area A11 located near the peripheral area A2. The first end area A11 is adjacent to the peripheral area A2. The first end area A11 has, for example, a shape of a rectangular frame. For example, of a plurality of pixels of the display panel 12, the outermost plurality of pixels are located in the first end area A11. In other words, the plurality of pixels in the uppermost row of the display panel 12 as viewed from the observer, the plurality of pixels in the lowermost row, the plurality of pixels in the leftmost row, and the plurality of pixels in the rightmost row are located in the first end area A11. FIGS. 2 and 3 depict the size of the first end area A11 in exaggeration to clarify the drawing. Pixels in a plurality of rows and pixels in a plurality of columns may be located in the first end area A11.

The display area A1 includes a second end area A12 located near the peripheral area A2 and including the first end area A11. The second end area A12 is adjacent to the peripheral area A2. The second end area A12 has, for example, a shape of a rectangular frame. The size of the second end area A12 is, as described later, determined by the control circuit 20 in accordance with the display image displayed in the display area A1.

The display image includes a first end image displayed in the second end area A12. The first end image includes a second end image displayed in the first end area A11.

The plurality of light sources 16 of the backlight 14 includes an end light source group 24 comprised of a plurality of light sources 16 arranged to overlap the second end area A12. In FIG. 3, some of the light sources 16 are illustrated.

A surface layer 17 has translucency. The surface layer 17 covers at least a portion of the display area A1 and at least a portion of the peripheral area A2. In the embodiment, the surface layer 17 covers the entirety of the display area A1 and the entirety of the peripheral area A2. The surface layer 17 is located more toward the observer than the display panel 12. As viewed from the observer, the surface layer 17 is larger than the display panel 12. As viewed from the observer, the surface layer 17 is located to overlap the entirety of the display panel 12. As viewed from the observer, the surface layer 17 includes a portion overlapping the display panel 12, i.e., a first portion 17a overlapping the display area A1, and a portion not overlapping the display panel 12, i.e., a second portion 17b overlapping the peripheral area A2. The first portion 17a includes a third portion 17c overlapping the first end area A11.

The surface layer 17 may be a cover panel that is not decorated or a decorated layer 18. In the embodiment, the surface layer 17 is the decorated layer 18. The decorated layer 18 has, for example, a pattern such as a wood grain pattern and has translucency. The decorated layer 18 may be a patterned decorated sheet or may be a layer provided by printing a translucent cover (not shown) with ink or transferring ink thereto.

The display image displayed on the display panel 12 can be viewed from the observer via the decorated layer 18. The pattern of the decorated layer 18 can also be viewed from the observer, and the observer can view the pattern of the decorated layer 18 as overlapping the display image. The observer can view the pattern of the decorated layer 18 in the peripheral area A2. This can improve the design of the display device 1. For example, the display screen of the display device 1 can be blended in the interior of the vehicle by using the decorated layer 18 having a pattern that matches the interior of the vehicle.

Given, as shown in FIG. 3, that the brightness of the image light output from the display panel 12 is denoted by L ($lm/sr/m^2$) and the transmittance of the decorated layer 18 is denoted by T (%), the brightness of the display image displayed in the display area A1 on the surface of the decorated layer 18 toward the observer is given by $LT/100$ ($cd/m^2$).

Given that the illuminance of the external light incident on the decorated layer 18 is denoted by E ($lm/m^2$), the reflectivity of the decorated layer 18 is denoted by R (%), and the reflectivity coefficient of the decorated layer 18 is denoted by k, the brightness of the external light reflected by the decorated layer 18 is given by $EkR/100$ ($cd/m^2$).

Therefore, the brightness on the surface of the decorated layer 18 toward the observer in the display area A1 is given by $(LT+EkR)/100$ ($cd/m^2$). The brightness on the surface of the decorated layer 18 toward the observer in the peripheral area A2 is given by $EkR/100$ ($cd/m^2$).

A description will now be given of the process in the control circuit 20 with reference to FIG. 1 through FIG. 3. The first acquisition unit 32 receives an illuminance E from the illuminance sensor 22. The second acquisition unit 34 acquires a brightness L of the second end image displayed in the first end area A11 from the image data for the display image. The brightness L of the second end image is, for example, an average value of the brightness of the plurality of pixels in the first end area A11. The brightness of a pixel can be derived by referring to the gradation value of the pixel in the image data and the brightness of the backlight 14.

The derivation unit 36 derives a brightness ratio $((LT+EkR)/EkR)$, defined as a ratio between the brightness of the first end area A11 and the brightness of the peripheral area A2, based on the illuminance E received and the brightness L of the second end image acquired. The brightness of the first end area A11 is, for example, the brightness on the surface of the third portion 17c toward the observer. The brightness of the peripheral area A2 is, for example, the brightness on the surface of the second portion 17b toward the observer. The brightness ratio is a ratio of the brightness of the first end area A11 with respect to the brightness of the peripheral area A2. The brightness ratio can be said to be contrast. The values of T, k, R are stored in a storage (not shown) in advance.

The control circuit 20 determines whether the brightness ratio derived is larger than a brightness ratio threshold value, which is a predefined value. When the brightness ratio is equal to or lower than the brightness ratio threshold value, the control circuit 20 displays the display image on the display panel 12 in accordance with the image data.

When the brightness ratio is larger than the brightness ratio threshold value, the control circuit 20 controls the display 10 to cause the brightness ratio to be equal to or smaller than the brightness ratio threshold value. More specifically, the control circuit 20 controls the display panel 12 or the backlight 14 to cause the brightness ratio to be equal to or smaller than the brightness ratio threshold value.

The brightness ratio threshold value is, for example, defined to be a value equal to or smaller than 10. The brightness ratio threshold value can be defined as appropriate by an experiment or simulation. Generally, when the brightness ratio is equal to or smaller than 10, it is difficult for the observer to recognize a difference between the brightness of the display area A1 and the brightness of the peripheral area A2 so that it is difficult for the observer to visually identify the boundary between the display area A1 and the peripheral area A2. The closer the brightness ratio to 1, the more difficult it is for the observer to visually identify the boundary between the display area A1 and the peripheral area A2. A description will now be given of an example where the brightness ratio threshold value is 2.

When the brightness ratio is larger than the brightness ratio threshold value, the control circuit 20 determines whether the brightness of the second end image is higher than a brightness threshold value, which is a predefined value.

The brightness threshold value is a threshold value to determine whether it is possible to decrease the brightness ratio by decreasing the brightness of the second end image. The brightness threshold value can be defined as appropriate by an experiment or simulation. The brightness threshold value may be defined to cause the brightness of the second end image to be lower than the brightness threshold value when many of the plurality of pixels forming the second end image are displayed in black with the minimum gradation value. The brightness threshold value may be defined to cause the brightness of the second end image to be lower than the brightness threshold value when one of the plurality of pixels forming the second end image is displayed in black with the minimum gradation value.

When the control circuit 20 determines that the brightness of the second end image is higher than the brightness threshold value, the control circuit 20 performs an image brightness decreasing process for decreasing the brightness of the first end image to cause the brightness ratio to be equal to or smaller than the brightness ratio threshold value by controlling the display panel 12. The control circuit 20 performs an image brightness decreasing process to cause the brightness of the first end image to gradually decrease from the center of the display area A1 toward the end of the display area A1.

When the control circuit 20 determines that the brightness of the second end image is equal to or lower than the brightness threshold value, the control circuit 20 performs a light intensity decreasing process for decreasing the light intensity of the end light source group 24 to cause the brightness ratio to be equal to or lower than the brightness ratio threshold value by controlling the backlight 14. Even if it is difficult to decrease the brightness ratio by controlling the display panel 12, the brightness ratio can be decreased by decreasing the light intensity of the end light source group 24.

First, a specific example of the image brightness decreasing process will be described, and a specific example of the light intensity decreasing process will be described later.

Figure 4:
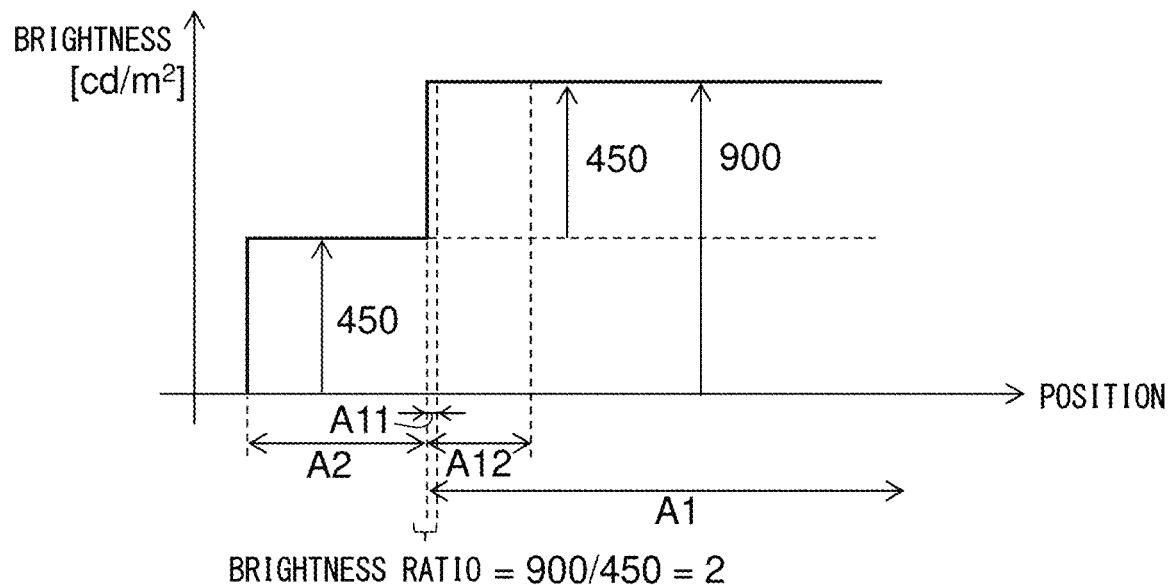
FIG. 4 shows the brightness at respective positions in the display occurring when the illuminance of the external light incident on the display of FIG. 3 is relatively high.

FIG. 4 shows the brightness at respective positions in the display 10 occurring when the illuminance of the external light incident on the display 10 of FIG. 3 is relatively high. The positions shown in FIG. 4 are positions near the peripheral area A2 and the second end area A12 on the left side of FIG. 3 in the horizontal direction. The brightness shown in FIG. 4 is the brightness at the respective positions on the surface of the decorated layer 18 toward the observer. The same holds true for the subsequent drawings.

FIG. 4 shows an example where the brightness of the peripheral area A2 is 450 (cd/m$^2$), and the brightness of the display image displayed in the display area A1 is 450 (cd/m$^2$) regardless of the position. In this case, the brightness of the display area A1 is 900 (cd/m$^2$) regardless of the position so that the brightness of the first end area A11 is also 900 (cd/m$^2$). Therefore, the brightness ratio between the brightness of the first end area A11 and the brightness of the peripheral area A2 is 900/450=2. It is therefore difficult for the observer to visually identify the boundary between the display area A1 and the peripheral area A2.

The determination unit 38 determines whether the brightness ratio derived in the derivation unit 36 is larger than the brightness ratio threshold value. When the brightness ratio is equal to or smaller than the brightness ratio threshold value, the image correction unit 42 does not correct the input image data and outputs the gradation values of the respective pixels in the image data to the display panel 12. Each of the plurality of pixels of the display panel 12 is controlled to have a light transmittivity determined by the gradation value.

When the brightness ratio is equal to or smaller than the brightness ratio threshold value, the backlight control unit 44 outputs a predefined reference current value to the backlight 14. The reference current value is a value at which each of the plurality of light sources 16 can emit light at predefined brightness, which is, for example, the maximum brightness. A current having the reference current value is caused to flow in each of the plurality of light sources 16 in the backlight 14.

Figure 5:
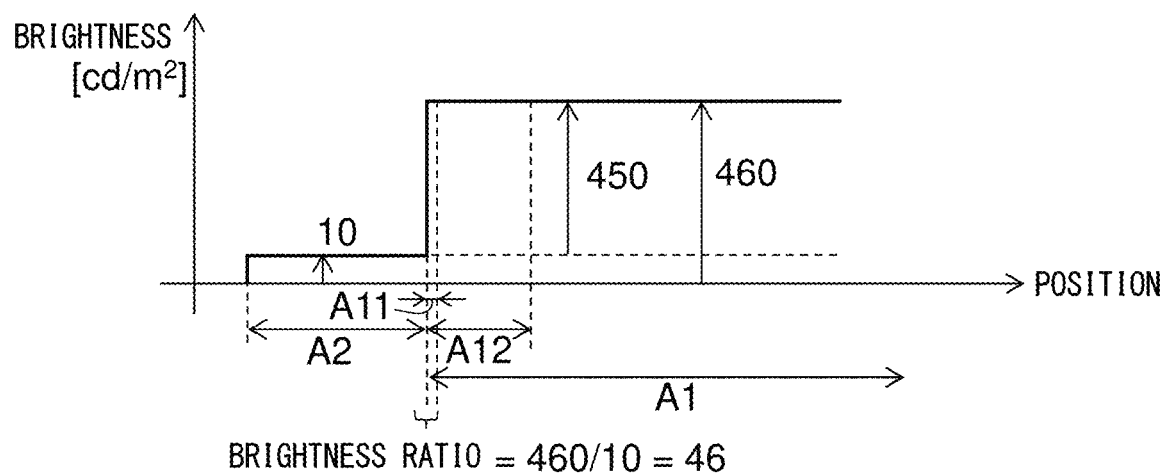
FIG. 5 shows the brightness before image correction at respective positions in the display occurring when the illuminance of the external light incident on the display of FIG. 3 is relatively low.

FIG. 5 shows the brightness before image correction at the respective positions in the display 10 occurring when the illuminance of the external light incident on the display 10 of FIG. 3 is relatively low. The positions shown in FIG. 5 correspond to the respective positions shown in FIG. 4. FIG. 5 shows the brightness of the display 10 in a situation, for example, at night or in a tunnel, where the environment around the display 10 is dark.

It is assumed that the illuminance of the external light becomes lower than that of the example of FIG. 4, and the brightness of the peripheral area A2 becomes lowered to 10 (cd/m$^2$). The brightness of the display image displayed in the display area A1 is the same as that of FIG. 4. In this case, the brightness of the display area A1 is 460 (cd/m$^2$) regardless of the position so that the brightness of the first end area A11 is also 460 (cd/m$^2$). Therefore, the brightness ratio between the brightness of the first end area A11 and the brightness of the peripheral area A2 is 460/10=46. This makes it easier for the observer to recognize the difference between the brightness of the display area A1 and the brightness of the peripheral area A2 and makes it easier for the observer to visually identify the boundary between the display area A1 and the peripheral area A2.

In this example, it is assumed that the brightness of the second end image is higher than the brightness threshold value. The determination unit 38 determines whether the brightness of the second end image is higher than the brightness threshold value, which is a predefined value. When the brightness ratio is larger than the brightness ratio threshold value, and the brightness of the second end image is higher than the brightness threshold value, the correction value generation unit 40 generates correction values for correcting the respective pixels of the first end image to cause the brightness of the first end image to gradually decrease from the center of the display area A1 toward the end of the display area A1. The correction value generation unit 40 generates correction values for correcting the respective pixels of the second end image so as to cause the brightness of the second end image to decrease to a value (brightness ratio threshold value−1) times the brightness of the peripheral area A2. The correction value generation unit 40 generates correction values so as not to correct the brightness of the respective pixels of the display image other than the first end image. The correction values for correcting the pixels of the display image other than the first end image are, for example, 1.

The image correction unit 42 multiplies the correction values for correcting the respective pixels generated by the correction value generation unit 40 by the gradation values of the corresponding pixels in the image data and outputs the resultant gradation values of the respective pixels to the display panel 12. The above-described processes performed by the correction value generation unit 40 and the image correction unit 42 correspond to the image brightness decreasing process. In this way, the brightness at the respective positions in the display 10 is controlled to the value shown in FIG. 6.

Figure 6:
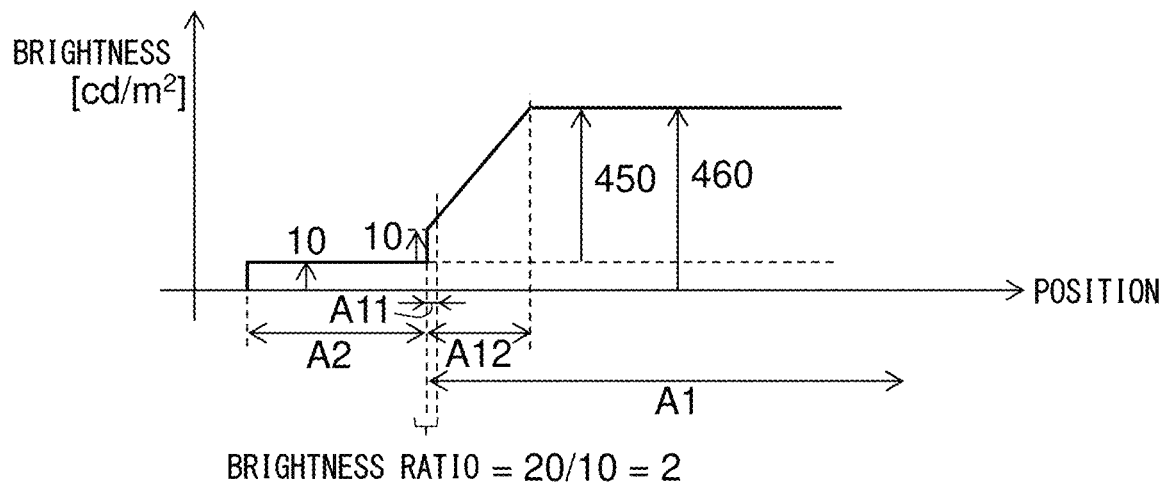
FIG. 6 shows the brightness after image correction at respective positions in the display occurring when the illuminance of the external light incident on the display of FIG. 3 is relatively low.

FIG. 6 shows the brightness after image correction at the respective positions in the display 10 occurring when the illuminance of the external light incident on the display 10 of FIG. 3 is relatively low. The positions shown in FIG. 6 also correspond to the respective positions shown in FIG. 4.

The display image displayed in the display area A1 other than the second end area A12 is not corrected so that the brightness thereof is 450 (cd/m$^2$) regardless of the position. The brightness of the second end image displayed in the first end area A11 is decreased to 10 (cd/m$^2$) by the correction. The brightness of the first end image displayed in the second end area A12 is corrected such that the closer to the peripheral area A2, the lower the brightness. The brightness of the first end area A11 is 20 (cd/m$^2$). Therefore, the brightness ratio between the brightness of the first end area A11 and the brightness of the peripheral area A2 is 20/10=2 and so is equal to the brightness ratio threshold value. The brightness ratio can be made lower than in the case shown in FIG. 5 by the correction so that it can be made difficult for the observer to visually identify the boundary between the display area A1 and the peripheral area A2. Further, the brightness of the display image displayed in the display area A1 other than the second end area A12 is the same as that of the case of FIG. 4. It is therefore possible to prevent a decline in visibility of the display image.

A more detailed description will now be given of the image brightness decreasing process. The control circuit 20 determines whether the display image is a centralized image in which only the central area has information or a non-centralized image in which the whole of the image has information. The control circuit 20 determines the detail of the image brightness decreasing process in accordance with the determination result. This makes it possible to perform the image brightness decreasing process adapted to the type of display image. When the control circuit 20 determines that the display image is a centralized image, the control circuit 20 performs the image brightness decreasing process so as to cause the brightness of the first end image to decrease linearly from the center of the display area A1 toward the end of the display area A1. The aforementioned process related to FIG. 6 is a process performed when the display image is a centralized image.

The characteristic detection unit 30 detects the characteristic of the display image by referring to the input image data. The characteristic detection unit 30 detects, for example, a position of an edge as the characteristic of the display image and outputs the detected position of the edge to the determination unit 38. For detection of the position of the edge, a publicly known technology can be used. For example, the characteristic detection unit 30 turns the display image into a gray scale, extracts a plurality of edges from the gray scale image, and detects the positions of the plurality of edges extracted.

The determination unit 38 determines whether the display image is a centralized image or a non-centralized image based on the positions of the edges detected and outputs the determination result to the correction value generation unit 40. When the edges are located only in the central area of the display image and no edges are located in the end area of the display image outside the central area, the determination unit 38 determines that the display image is a centralized image. The size of the central area is determined by the position of the outermost edge. When the edges are located at the end of the display image, the determination unit 38 determines that the display image is a non-centralized image.

FIGS. 7A through 7E are diagrams for describing the image brightness decreasing process for a centralized image. FIG. 7A shows a display image displayed on the display panel 12. FIG. 7B schematically shows the brightness at the respective positions in the display image of FIG. 7A along A-A. The display image includes a plurality of icons 50 located in the central area A20. The end area of the display image is an area around the central area in which the plurality of icons 50 are located and is, for example, displayed in white and does not include information. The end area of the display image is located in the second end area A12.

FIG. 7C shows the correction value for correcting the brightness at the respective positions in the display image corresponding to the positions of FIG. 7B. When the brightness ratio is larger than the brightness ratio threshold value, and when the brightness of the second end image is higher than the brightness threshold value, and when the display image is a centralized image, the correction value generation unit 40 generates correction values for correcting the respective pixels of the first end image to cause the brightness of the first end image to decrease linearly from the center of the display area A1 toward the end of the display area A1. The correction value generation unit 40 identifies, based on the positions of the plurality of edges detected by the characteristic detection unit 30, an area where there are no edges as the second end area A12 and, accordingly, identifies the first end image displayed in the second end area A12.

FIG. 7D shows the brightness at the respective positions corresponding to the positions of FIG. 7B occurring after multiplication by the correction values of FIG. 7C. FIG. 7E schematically shows the post-correction display image corresponding to the brightness shown in FIG. 7D. In the corrected display image, the brightness of the first end image decreases linearly. Therefore, the brightness change in the first end image according to the position can be made less noticeable. Meanwhile, the plurality of icons 50 located outside the second end area A12 are shown without being subjected to brightness correction. In other words, it is possible to prevent a decline in visibility of the plurality of icons 50 because the plurality of icons 50 are shown without a decrease in the brightness.

FIGS. 8A and 8B are diagrams for describing correction values for correcting the display image of FIGS. 7A-7E. FIG. 8A shows a portion of the display area A1 shown in FIG. 7A. Pixel P1 is a pixel located leftmost in the display image. Pixel P2 is a pixel located on the left edge of the icon 50. Pixel P1 and pixel P2 are located in the same row.

FIG. 8B shows the pre-correction brightness and the post-correction brightness at the positions of the respective pixels of the display image from pixel P1 to pixel P2 shown in FIG. 8A. The correction value generation unit 40 defines a reference straight line L1 having a predefined inclination and passing through the post-correction brightness of pixel P1 at the position of pixel P1. The inclination of the reference straight line L1 can be determined as appropriate by an experiment or simulation. The inclination of the reference straight line L1 is defined to meet a condition whereby the brightness change becomes less noticeable by causing the brightness at the respective positions in the display image to have a value on the reference straight line L1. The inclination of the reference straight line L1 is, for example, 2 ($cd/m^2$/1 pixel). The inclination of the reference straight line L1 is, for example, a constant value regardless of the display image.

When the pre-correction brightness of pixel P2 is equal to or lower than the value on the reference straight line L1 at the position of pixel P2, the correction value generation unit 40 generates correction values to cause the post-correction brightness at the respective positions between pixel P1 and pixel P2 to have a value on a straight line connecting the post-correction brightness of pixel P1 and the pre-correction brightness value of pixel P2. The brightness of pixel P2 is not corrected so that the correction value for correcting pixel P2 is 1. In this case, the inclination of the straight line connecting the post-correction brightness of pixel P1 and the brightness of pixel P2 is smaller than the inclination of the reference straight line L1 so that the brightness change in the first end image can be made less noticeable.

FIGS. 9A and 9B are diagrams for describing correction values for correcting another display image. FIG. 9A shows an example where the icon 50 is closer to the end of the display area A1 than in the example shown in FIG. 8A. FIG. 9B shows the pre-correction brightness and the post-correction brightness at the positions of the respective pixels of the display image from pixel P1 to pixel P2 shown in FIG. 9A. The pixel in the second end area A12 adjacent to pixel P2 is denoted as pixel P3. Pixel P1, pixel P2, and pixel P3 are located in the same row.

When the pre-correction brightness of pixel P2 is higher than the value on the reference straight line L1 at the position of pixel P2, the correction value generation unit 40 generates correction values to cause the post-correction brightness at the respective positions between pixel P1 and pixel P3 to have a value on the reference straight line L1. The brightness of pixel P2 is not corrected so that the correction value for correcting pixel P2 is 1. This causes the brightness of the first end image to decrease linearly from the center of the display area A1 toward the end of the display area A1. In this case, the straight line connecting the post-correction brightness of pixel P1 and the post-correction brightness of pixel P3 matches the reference straight line L1 so that the brightness change from pixel P1 to pixel P3 can be made less noticeable.

The inclination of the reference straight line L1 may be defined for each display image. For example, the inclination of the reference straight line L1 may be defined such that the reference straight line L1 passes through, at the position of pixel P2, a point of brightness derived from multiplying the brightness of the first end area A11 by the brightness threshold value.

The image brightness decreasing process for a non-centralized image will be described, highlighting the difference from the image brightness decreasing process for a centralized image. When the control circuit 20 determines that the display image is a non-centralized image, the control circuit 20 performs the image brightness decreasing process to cause the brightness of the first end image to decrease non-linearly from the center of the display area A1 toward the end of the display area A1.

FIGS. 10A-10E are diagrams for describing the image brightness decreasing process for a non-centralized image. FIG. 10A shows a display image displayed on the display panel 12. FIG. 10B schematically shows the brightness at the respective positions in the display image of FIG. 10A along B-B. The figure shows a case where the display image is a non-centralized image showing a map image on the entirety of the display panel 12. In the case of a non-centralized image, the second end area A12 is predefined. The second end area A12 on the left side and on the right side each includes one-tenth or more of the pixels in the row direction of the display panel 12. The second end area A12 on the upper side and on the lower side each includes one-tenth or more of the pixels in the column direction of the display panel 12.

FIG. 10C shows the correction values for correcting the brightness at the respective positions in the display image corresponding to the positions of FIG. 10B. When the brightness ratio is larger than the brightness ratio threshold value, and when the brightness of the second end image is higher than the brightness threshold value, and when the display image is a centralized image, the correction value generation unit 40 generates correction values for correcting the respective pixels of the first end image to cause the brightness of the first end image to decrease non-linearly from the center of the display area A1 toward the end of the display area A1. The correction value generation unit 40 generates correction values such that the closer to the end of the display area A1, the larger the reduction of the brightness of the first end image. The correction value generation unit 40 identifies the first end image in the predefined second end area A12.

The correction value generation unit 40 uses, for example, gamma correction to create correction values for correcting the respective pixels of the first end image. The correction value generation unit 40 creates a correction value between the correction value for correcting pixel P1 and the correction value for correcting pixel P2 based on a gamma curved given by $y=x^\gamma$. $\gamma$ is, for example, 1/2.2. The correction value for correcting pixel P1 is defined as described with reference to FIG. 5 and FIG. 6. The correction value for correcting pixel P2 is 1.

FIG. 10D shows the brightness at the respective positions corresponding to the positions of FIG. 10B occurring after multiplication by the correction values of FIG. 10C. FIG. 10E schematically shows the post-correction display image corresponding to the brightness shown in FIG. 10D. In the corrected display image, it is possible to prevent a decline in visibility in a portion of the first end image near the center of the display area A1. The brightness of the area other than the second end area A12 is the same as the pre-correction brightness so that it is possible to prevent a decline in visibility in the central area of the display image.

Figure 11:
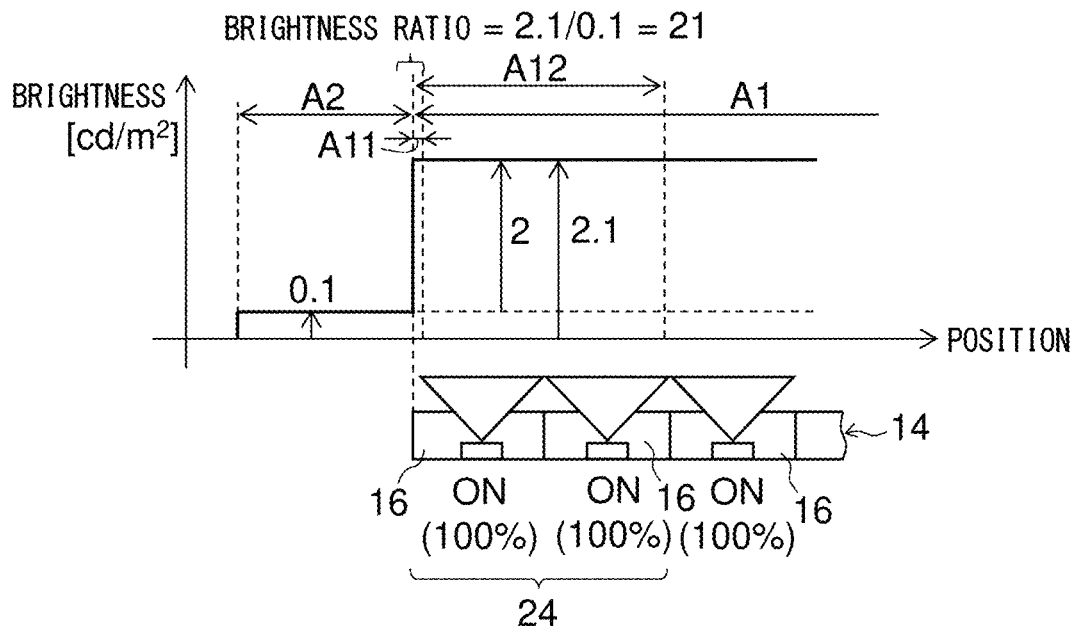
FIG. 11 shows the pre-correction brightness at the respective positions in the display occurring when the illuminance of the external light incident on the display of FIG. 1 is relatively low and when the second end area is displayed in black.

A description will now be given of a specific example of light intensity decreasing process. FIG. 11 shows the pre-correction brightness at the respective positions in the display 10 occurring when the illuminance of the external light incident on the display 10 of FIG. 1 is relatively low and when the second end area A12 is displayed in black. FIG. 11 shows the brightness of the display 10 in a situation, for example, at night or in a tunnel, where the environment around is dark.

FIG. 11 shows an example where the brightness of the peripheral area A2 is 0.1 ($cd/m^2$), and the brightness of the display image displayed near the end of the display area A1 is 2 ($cd/m^2$) regardless of the position. The gradation values of the respective pixels of the display image displayed near the end of the display area A1 are minimum values. The brightness of the second end image is equal to or lower than the brightness threshold value. The respective light source 16 of the backlight 14 including the end light source group 24 emit light at the maximum brightness. Light emission of the light source 16 at the maximum brightness may be referred to as light emission of the light source 16 at 100% light intensity. The current value capable of causing the light source 16 to emit light at 100% light intensity may be referred to as 100% current value. Stated otherwise, 100% current value is a reference current value. In the example of FIG. 11, each light source 16 is driven by 100% current value.

In this case, the brightness of the display area A1 is 2.1 ($cd/m^2$) regardless of the position so that the brightness of the first end area A11 is also 2.1 ($cd/m^2$). Therefore, the brightness ratio between the brightness of the first end area A11 and the brightness of the peripheral area A2 is 2.1/0.1=21. It is therefore easy for the observer to visually identify the boundary between the display area A1 and the peripheral area A2.

When the light intensity decreasing process is performed, the second end area A12 is predefined. For example, the second end area A12 in the case where the display image is a non-centralized image can be employed.

The area in the display area A1 toward the center (not shown) may be such that an icon, etc. is displayed at the brightness of 100-1000 ($cd/m^2$).

When the brightness ratio is larger than the brightness ratio threshold value, and when the brightness of the second end image is equal to or lower than the brightness threshold value, the control circuit 20 performs the light intensity decreasing process to cause the light intensity of the end light source group 24 to decrease gradually, for example, linearly, from the center of the display area A1 toward the end of the display area A1.

More specifically, the correction value generation unit 40 generates correction values for correcting the current values of the end light source group 24 to cause the light intensity of the end light source group 24 to decrease linearly from the center of the display area A1 toward the end of the display area A1. The correction value generation unit 40 generates correction values to cause the brightness of the second end image to decrease to a value (brightness ratio threshold value−1) times the brightness of the peripheral area A2. The correction value generation unit 40 generates correction values so as not to change the current value of the light sources 16 other than the end light source group 24.

The backlight control unit 44 corrects the reference current value by multiplying it by the correction value generated by the correction value generation unit 40 and outputs the corrected current value to the backlight 14. The above-described process performed by the correction value generation unit 40 and the backlight control unit 44 correspond to the light intensity decreasing process. Thus, the brightness at the respective positions in the display 10 is controlled to the value shown in FIG. 12.

Figure 12:
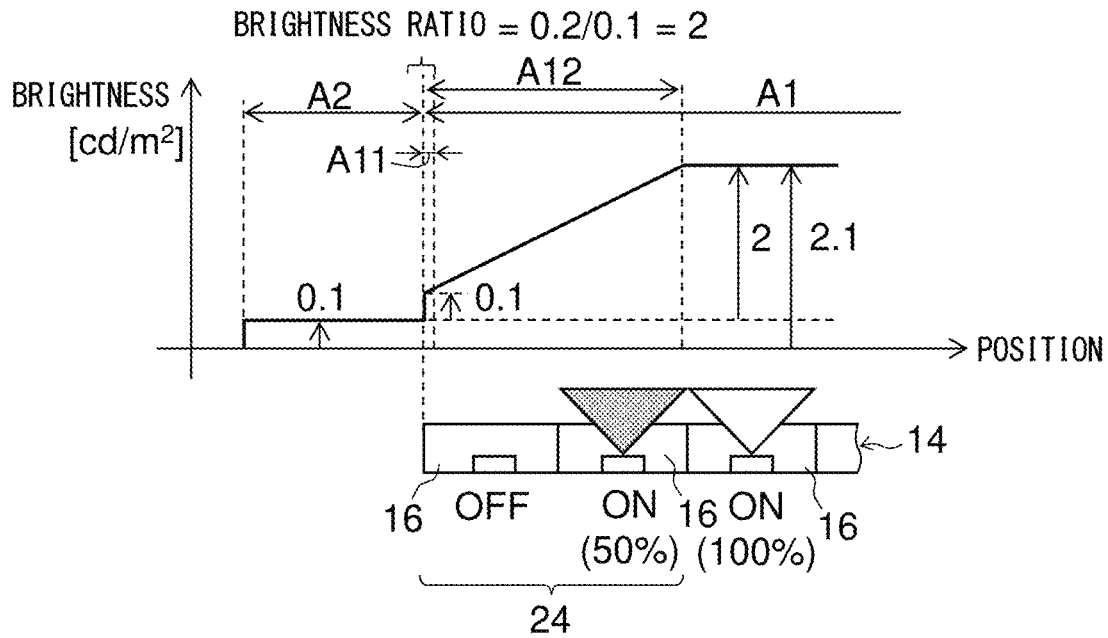
FIG. 12 shows the post-correction brightness at the respective positions in the display occurring when the illuminance of the external light incident on the display of FIG. 1 is relatively low and when the second end area is displayed in black.

FIG. 12 shows the post-correction brightness at the respective positions in the display 10 occurring when the illuminance of the external light incident on the display 10 of FIG. 1 is relatively low and when the second end area A12 is displayed in black. The positions shown in FIG. 12 correspond to the positions shown in FIG. 11.

The current value of the current for driving the light source 16 in the end light source group 24 toward the end of the display area A1 is controlled to be zero. Consequently, the light source 16 in the end light source group 24 at the end of the display area A1 is turned off. The current value of the current for driving the light source 16 in the end light source group 24 toward the center of the display area A1 is controlled to be 50% of the reference current value. Consequently, the light intensity of the light source 16 in the end light source group 24 toward the center of the display area A1 is decreased from 100%.

The brightness of the display image displayed in display area A1 near the second end area A12 is 2 (cd/m$^2$) The brightness of the second end image displayed in the first end area A11 is corrected to be decreased to 0.1 (cd/m$^2$). The closer to the peripheral area A2, the lower the brightness of the first end image displayed in the second end area A12.

The brightness of the first end area A11 is 0.2 (cd/m$^2$). Therefore, the brightness ratio between the brightness of the first end area A11 and the brightness of the peripheral area A2 is 0.2/0.1=2, which is equal to the brightness ratio threshold value. The brightness ratio can be made smaller than in the case shown in FIG. 11 by the correction so that it can be made difficult for the observer to visually identify the boundary between the display area A1 and the peripheral area A2. Further, the brightness decreases linearly in the second end area A12. Therefore, the brightness change in the first end image according to the position can be made less noticeable. Further, the brightness of the display image displayed in the display area A1 other than the second end area A12 is the same as that of the case of FIG. 11. It is therefore possible to prevent a decline in visibility of the display image.

Figure 13:
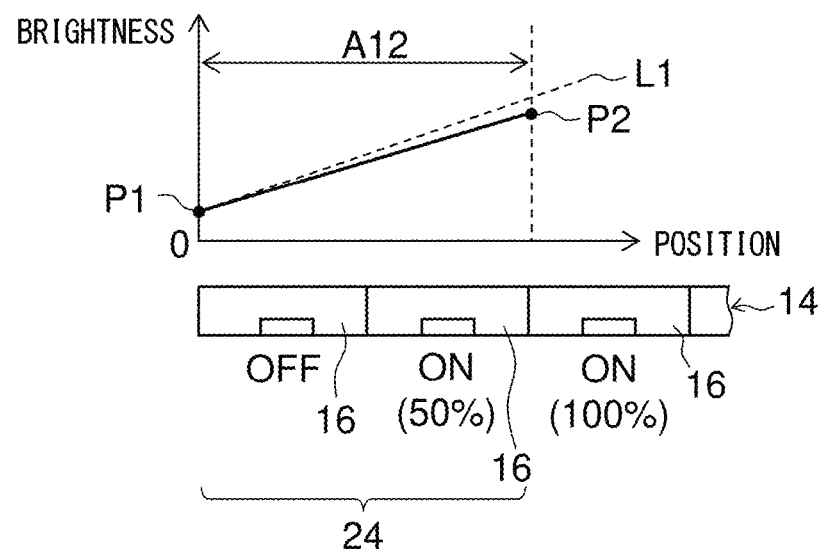
FIG. 13 is a diagram for describing correction values in the light intensity decreasing process.

FIG. 13 is a diagram for describing correction values in the light intensity decreasing process. FIG. 13 shows the post-correction brightness at the positions in the respective pixels in the second end area A12 from pixel P1 to pixel P2. The brightness of pixel P2 remains unchanged before and after the correction.

The correction value generation unit 40 defines a reference straight line L1 passing through the post-correction brightness of pixel P1 at the position of pixel P1. The reference straight line L1 is, for example, the same as the one described in the image brightness decreasing process. When the pre-correction brightness of pixel P2 is equal to or lower than the value on the reference straight line L1 at the position of pixel P2, the correction value generation unit 40 generates correction values to cause the post-correction brightness at the respective positions between pixel P1 and pixel P2 to have a value on a straight line connecting the post-correction brightness of pixel P1 and the pre-correction brightness value of P2. In this case, the inclination of the straight line connecting the post-correction brightness of pixel P1 and the brightness of pixel P2 is smaller than the inclination of the reference straight line L1 so that the brightness change in the first end image can be made less noticeable.

Figure 14:
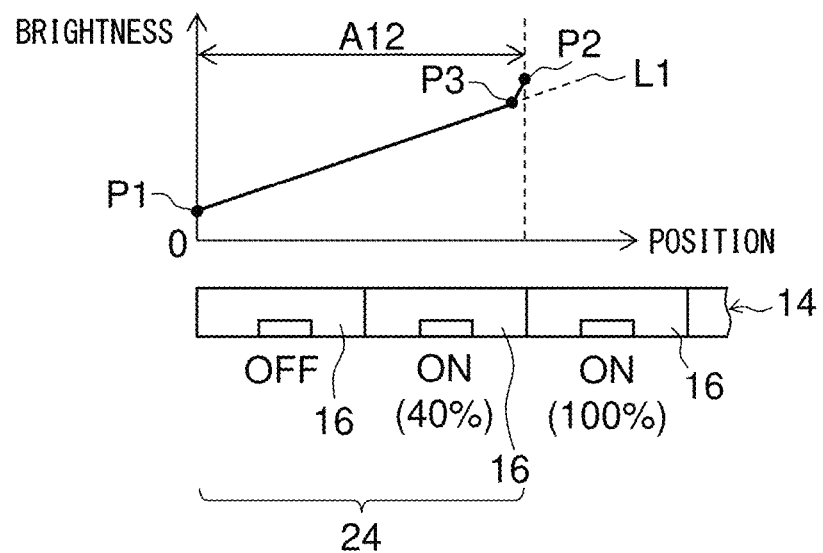
FIG. 14 is a diagram for describing correction values for correcting another display image.

FIG. 14 is a diagram for describing correction values for correcting another display image. FIG. 14 shows an example where the gradation value of pixel P2 is larger than that of the example shown in FIG. 13. The pixel in the second end area A12 adjacent to pixel P2 is denoted as pixel P3.

When the pre-correction brightness of pixel P2 is higher than the value on the reference straight line L1 at the position of pixel P2, the correction value generation unit 40 generates correction values to cause the post-correction brightness at the respective positions between pixel P1 and pixel P3 to have a value on the reference straight line L1. The brightness of pixel P2 is not corrected. This causes the brightness of the first end image to decrease linearly from the center of the display area A1 toward the end of the display area A1. In this case, the straight line connecting the post-correction brightness of pixel P1 and the post-correction brightness of pixel P3 matches the reference straight line L1 so that the brightness change from pixel P1 to pixel P3 can be made less noticeable.

Figure 15:
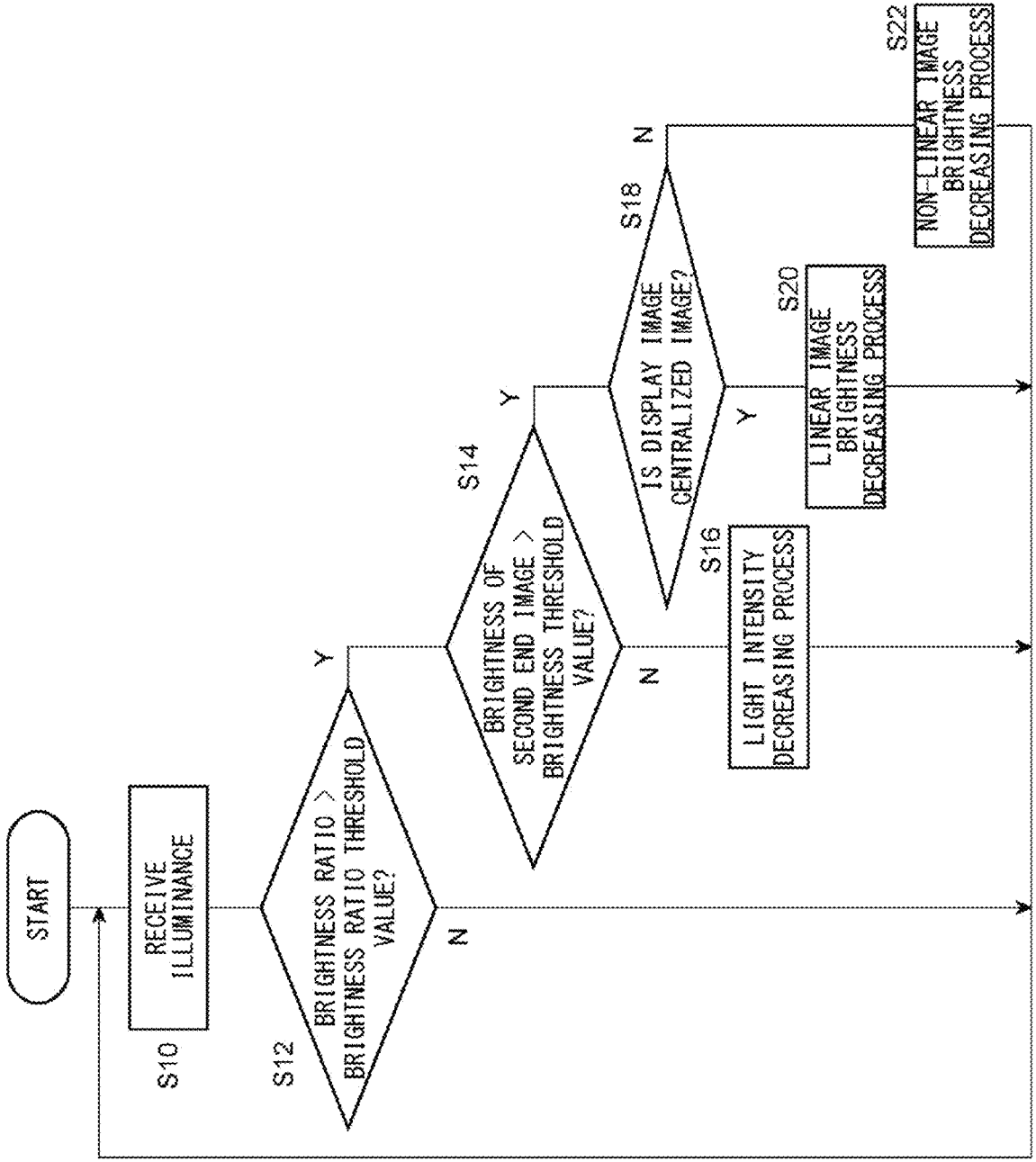
FIG. 15 is a flowchart showing a process in the control circuit of FIG. 1.

FIG. 15 is a flowchart showing a process in the control circuit 20 of FIG. 1. The control circuit 20 receives the illuminance from the illuminance sensor 22 (S10). The control circuit 20 determines whether or not the brightness ratio is larger than the brightness ratio threshold value (S12). When the control circuit 20 determines that brightness ratio is not larger than the brightness ratio threshold value (N in S12), the process returns to S10. When the control circuit 20 determines that the brightness ratio is larger than the brightness ratio threshold value (Y in S12), the control circuit 20 determines whether or not the brightness of the second end image is higher than the brightness threshold value (S14). When the control circuit 20 determines that the brightness of the second end image is not higher than the brightness threshold value (N in S14), the control circuit 20 performs a light intensity decreasing process (S16), and the process returns to S10.

When the control circuit 20 determines that the brightness of the second end image is higher than the brightness threshold value (Y in S14), the control circuit 20 determines whether or not the display image is a centralized image (S18). When the control circuit 20 determines that the display image is a centralized image (Y in S18), the control circuit 20 performs a linear image brightness decreasing process (S20), and the process returns to S10. When the control circuit 20 determines that the display image is not a centralized image (N in S18), the control circuit 20 performs a non-linear image brightness decreasing process (S22), and the process returns to S10.

As described above, according to the embodiment, the display 10 is controlled to cause the brightness ratio to be equal to or smaller than the brightness ratio threshold value when the brightness ratio is larger than the brightness ratio threshold value. Therefore, it can be made difficult for the observer to visually identify the boundary between the display area A1 and the peripheral area A2.

The present disclosure has been described above based on the embodiment. The embodiment is intended to be illustrative only and it will be understood by those skilled in the art that various modifications to combinations of constituting elements and processes are possible and that such modifications are also within the scope of the present disclosure.

For example, the control circuit 20 may control both the display panel 12 and the backlight 14 and perform an image brightness decreasing process and a light intensity decreasing process to cause the brightness ratio to be equal to or smaller than the brightness ratio threshold value when the brightness ratio is larger than the brightness ratio threshold value and when the brightness of the second end image is higher than the brightness threshold value. This variation improves flexibility of control.

One aspect of the present disclosure is summarized below.

[Item 1]
A display device including: a display that includes a display area for displaying a display image, and a peripheral area surrounding the display area; and
a control circuit that receives, from an illuminance sensor for detecting an illuminance of an incident light, the illuminance and controls the display, wherein
the display area includes a first end area that is an area located near the peripheral area, and
the control circuit
derives a brightness ratio that is a ratio between a brightness of the first end area and a brightness of the peripheral area, based on the illuminance and image data for the display image, and
controls the display to cause, when the brightness ratio is larger than a brightness ratio threshold value that is a predefined value, the brightness ratio to be equal to or smaller than the brightness ratio threshold value.

According to this aspect, the display is controlled to cause the brightness ratio to be equal to or lower than the brightness ratio threshold value when the brightness ratio is larger than the brightness ratio threshold value. Therefore, it can be made difficult for the observer to visually identify the boundary between the display area and the peripheral area.

[Item 2]
The display device according to item 1, wherein
the display includes a surface layer that covers at least a portion of the display area and at least a portion of the peripheral area,
the surface layer includes a first portion overlapping the display area and a second portion overlapping the peripheral area,
the first portion includes a third portion overlapping the first end area,
the brightness of the first end area is a brightness on a surface of the third portion toward an observer, and
the brightness of the peripheral area is a brightness on a surface of the second portion toward the observer.

In this case, it can be made difficult to visually identify the boundary between the display area and the peripheral area in a display device including a surface layer.

[Item 3]
The display device according to item 2, wherein the surface layer is a decorated layer having a pattern and having translucency.

In this case, the design of the display device can be improved.

[Item 4]
The display device according to any one of item 1 through item 3, wherein
the display includes:
a display panel that displays the display image in the display area; and
a backlight that includes a plurality of light sources and radiates a light to the display panel, and
when the brightness ratio is larger than the brightness ratio threshold value, the control circuit controls at least one of the display panel or the backlight to cause the brightness ratio to be equal to or smaller than the brightness ratio threshold value.

In this case, it can be made difficult to visually identify the boundary between the display area and the peripheral area in a display device including a display panel and a backlight.

[Item 5]
The display device according to item 4, wherein
the display area includes a second end area that is an area located near the peripheral area and including the first end area,
the display image includes a first end image displayed in the second end area, and
when the brightness ratio is larger than the brightness ratio threshold value, the control circuit performs an image brightness decreasing process for controlling the display panel to decrease a brightness of the first end image to cause the brightness ratio to be equal to or smaller than the brightness ratio threshold value.

In this case, the brightness ratio can be lowered by lowering the brightness of the first end image.

[Item 6]
The display device according to item 5, wherein
the first end image includes a second end image displayed in the first end area, and
the control circuit
determines whether a brightness of the second end image is higher than a brightness threshold value that is a predefined value, and
performs the image brightness decreasing process when the control circuit determines that the brightness of the second end image is higher than the brightness threshold value.

In this case, the brightness ratio can be lowered by the image brightness decreasing process.

[Item 7]
The display device according to item 5 or item 6, wherein the control circuit performs the image brightness decreasing process to cause the brightness of the first end image to decrease from a center of the display area toward an end of the display area.

In this case, the brightness change in the first end image according to the position can be made less noticeable.

[Item 8]
The display device according to any one of item 5 through item 7, wherein the control circuit determines whether the display image is a centralized image in which only a central area has information or a non-centralized image in which a whole of the display image has information, and determines a detail of the image brightness decreasing process in accordance with a determination result.

In this case, it is possible to perform the image brightness decreasing process adapted to the type of display image.

[Item 9]
The display device according to item 8, wherein
when the control circuit determines that the display image is the centralized image, the control circuit performs the image brightness decreasing process to cause the brightness of the first end image to decrease linearly from a center of the display area toward an end of the display area.

In this case, the brightness change in the first end image according to the position can be made less noticeable.

[Item 10]

The display device according to item 8 or item 9, wherein when the control circuit determines that the display image is the non-centralized image, the control circuit performs the image brightness decreasing process to cause the brightness of the first end image to decrease non-linearly from a center of the display area toward an end of the display area.

In this case, the image brightness decreasing process can be performed to prevent a decline in visibility in a portion of the first end image near the center of the display area.

[Item 11]

The display device according to item 4, wherein
the display area includes a second end area that is an area located near the peripheral area and including the first end area,
the plurality of light sources include an end light source group comprised of a plurality of light sources arranged to overlap the second end area, and
when the brightness ratio is larger than the brightness ratio threshold value, the control circuit performs a light intensity decreasing process for decreasing a light intensity of the end light source group to cause the brightness ratio to be equal to or smaller than the brightness ratio threshold value.

In this case, the brightness ratio can be lowered by lowering the light intensity of the end light source group.

[Item 12]

The display device according to item 11, wherein
the display image includes a first end image displayed in the second end area,
the first end image includes a second end image displayed in the first end area, and
the control circuit
determines whether a brightness of the second end image is equal to or lower than a brightness threshold value that is a predefined value, and
performs the light intensity decreasing process when the control circuit determines that the brightness of the second end image is equal to or lower than the brightness threshold value.

In this case, the brightness can be lowered even in a case where it is difficult to decrease the brightness ratio by controlling the display panel.

[Item 13]

The display device according to item 11 or item 12, wherein
the control circuit performs the light intensity decreasing process to cause the light intensity of the end light source group to decrease from a center of the display area toward an end of the display area.

In this case, the brightness change in the first end image according to the position can be made less noticeable.

[Item 14]

The display device according to item 13, wherein
the control circuit performs the light intensity decreasing process to cause the light intensity of the end light source group to decrease linearly from the center of the display area toward the end of the display area.

In this case, the brightness change in the first end image according to the position can be made less noticeable.

[Item 15]

The display device according to any one of item 1 through item 14, including the illuminance sensor.

In this case, it is possible to provide a display device capable of detecting illuminance.

[Item 16]

A control method adapted to a display device including a display that includes a display area for displaying a display image, and a peripheral area surrounding the display area, the display area including a first end area that is an area located near the peripheral area, the method including:
receiving, from an illuminance sensor for detecting an illuminance of an incident light, the illuminance;
deriving a brightness ratio that is a ratio between a brightness of the first end area and a brightness of the peripheral area, based on the illuminance; and
controlling, when the brightness ratio is larger than a brightness ratio threshold value that is a predefined value, the display to cause the brightness ratio to be equal to or smaller than the brightness ratio threshold value.

According to this aspect, it can be made difficult for the observer to visually identify the boundary between the display area and the peripheral area.

While various embodiments have been described herein above, it is to be appreciated that various changes in form and detail may be made without departing from the spirit and scope of the invention(s) presently or hereafter claimed.

CROSS-REFERENCE TO RELATED APPLICATIONS

This application is based upon and claims the benefit of priority from the prior Japanese Patent Application No. 2022-123748, filed on Aug. 3, 2022, the entire contents of which are incorporated herein by reference.

What is claimed is:

1. A display device comprising:
a display that includes a display area for displaying a display image, and a peripheral area surrounding the display area; and
a control circuit that receives, from an illuminance sensor for detecting an illuminance of an incident light, the illuminance and controls the display, wherein
the display area includes a first end area that is an area located near the peripheral area, and
the control circuit:
derives a brightness ratio that is a ratio between a brightness of the first end area and a brightness of the peripheral area, based on the illuminance and image data for the display image; and
controls, when the brightness ratio is larger than a brightness ratio threshold value that is a predefined value, the display to cause the brightness ratio to be equal to or smaller than the brightness ratio threshold value,
the display includes a surface layer that covers at least a portion of the display area and at least a portion of the peripheral area,
the surface layer includes a first portion overlapping the display area and a second portion overlapping the peripheral area,
the first portion includes a third portion overlapping the first end area, the brightness of the first end area is a brightness on a surface of the third portion toward an observer, and
the brightness of the peripheral area is a brightness on a surface of the second portion toward the observer.

2. The display device according to claim 1, wherein the surface layer is a decorated layer having a pattern and having translucency.

3. The display device according to claim 1, wherein the display includes:
- a display panel that displays the display image in the display area; and
- a backlight that includes a plurality of light sources and radiates a light to the display panel, and when the brightness ratio is larger than the brightness ratio threshold value, the control circuit controls at least one of the display panel or the backlight to cause the brightness ratio to be equal to or smaller than the brightness ratio threshold value.

4. The display device according to claim 3, wherein the display area includes a second end area that is an area located near the peripheral area and including the first end area, the display image includes a first end image displayed in the second end area, and when the brightness ratio is larger than the brightness ratio threshold value, the control circuit performs an image brightness decreasing process for controlling the display panel to decrease a brightness of the first end image to cause the brightness ratio to be equal to or smaller than the brightness ratio threshold value.

5. The display device according to claim 4, wherein the first end image includes a second end image displayed in the first end area, and the control circuit:
- determines whether a brightness of the second end image is higher than a brightness threshold value that is a predefined value; and
- performs the image brightness decreasing process when the control circuit determines that the brightness of the second end image is higher than the brightness threshold value.

6. The display device according to claim 4, wherein the control circuit performs the image brightness decreasing process to cause the brightness of the first end image to decrease from a center of the display area toward an end of the display area.

7. The display device according to claim 4, wherein the control circuit determines whether the display image is a centralized image in which only a central area has information or a non-centralized image in which a whole of the display image has information, and determines a detail of the image brightness decreasing process in accordance with a determination result.

8. The display device according to claim 7, wherein when the control circuit determines that the display image is the centralized image, the control circuit performs the image brightness decreasing process to cause the brightness of the first end image to decrease linearly from a center of the display area toward an end of the display area.

9. The display device according to claim 7, wherein when the control circuit determines that the display image is the non-centralized image, the control circuit performs the image brightness decreasing process to cause the brightness of the first end image to decrease non-linearly from a center of the display area toward an end of the display area.

10. The display device according to claim 3, wherein the display area includes a second end area that is an area located near the peripheral area and including the first end area, the plurality of light sources include an end light source group comprised of a plurality of light sources arranged to overlap the second end area, and when the brightness ratio is larger than the brightness ratio threshold value, the control circuit performs a light intensity decreasing process for decreasing a light intensity of the end light source group to cause the brightness ratio to be equal to or smaller than the brightness ratio threshold value.

11. The display device according to claim 10, wherein the display image includes a first end image displayed in the second end area, the first end image includes a second end image displayed in the first end area, and the control circuit:
- determines whether a brightness of the second end image is equal to or lower than a brightness threshold value that is a predefined value; and
- performs the light intensity decreasing process when the control circuit determines that the brightness of the second end image is equal to or lower than the brightness threshold value.

12. The display device according to claim 10, wherein the control circuit performs the light intensity decreasing process to cause the light intensity of the end light source group to decrease from a center of the display area toward an end of the display area.

13. The display device according to claim 12, wherein the control circuit performs the light intensity decreasing process to cause the light intensity of the end light source group to decrease linearly from the center of the display area toward the end of the display area.

14. The display device according to claim 1, comprising the illuminance sensor.

15. A control method adapted to a display device including a display that includes a display area for displaying a display image, and a peripheral area surrounding the display area, the display area including a first end area that is an area located near the peripheral area, the method comprising:
- receiving, from an illuminance sensor for detecting an illuminance of an incident light, the illuminance;
- deriving a brightness ratio that is a ratio between a brightness of the first end area and a brightness of the peripheral area, based on the illuminance; and
- controlling, when the brightness ratio is larger than a brightness ratio threshold value that is a predefined value, the display to cause the brightness ratio to be equal to or smaller than the brightness ratio threshold value, wherein the display includes a surface layer that covers at least a portion of the display area and at least a portion of the peripheral area, the surface layer includes a first portion overlapping the display area and a second portion overlapping the peripheral area, the first portion includes a third portion overlapping the first end area, the brightness of the first end area is a brightness on a surface of the third portion toward an observer, and the brightness of the peripheral area is a brightness on a surface of the second portion toward the observer.

* * * * *